United States Patent
Sukegawa et al.

(10) Patent No.: US 6,293,618 B1
(45) Date of Patent: Sep. 25, 2001

(54) PILLAR JOINT STRUCTURE FOR AUTOMOTIVE VEHICLE

(75) Inventors: Akihiro Sukegawa; Akira Nakashima, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/415,204

(22) Filed: Oct. 12, 1999

(30) Foreign Application Priority Data

Oct. 15, 1998 (JP) .................................................. 10-293968

(51) Int. Cl.⁷ .................................................. B62D 27/00
(52) U.S. Cl. ............... 296/209; 205/203.01; 205/203.03; 205/29; 403/230
(58) Field of Search ............... 296/205, 203.01, 296/203.03, 29; 403/230, 231, 233, 243

(56) References Cited

U.S. PATENT DOCUMENTS

| | | | |
|---|---|---|---|
| 4,552,400 | * 11/1985 | Harasaki et al. | 296/203 |
| 4,747,636 | * 5/1988 | Harasaki et al. | 296/203 |
| 4,986,597 | * 1/1991 | Clausen | 296/205 |
| 5,352,011 | * 10/1994 | Kihara et al. | 296/203 |
| 5,372,400 | * 12/1994 | Enning et al. | 296/203 |
| 5,603,581 | * 2/1997 | Fujita et al. | 296/29 |
| 5,829,219 | * 11/1998 | Sugawara et al. | 296/205 |
| 6,003,898 | * 12/1999 | Teply et al. | 296/203.01 |
| 6,123,378 | * 9/2000 | Teply et al. | 296/205 |

FOREIGN PATENT DOCUMENTS

| | | | |
|---|---|---|---|
| 599 161 | 6/1934 | (DE) . | |
| 195 17 922 | 11/1996 | (DE) | B62D/21/02 |
| 0 336 781 | * 10/1989 | (EP) . | |
| 62-11262 | 3/1987 | (JP) | B62D/25/20 |
| 3 32990 | * 6/1989 | (JP) . | |
| 4 66375 | * 7/1990 | (JP) . | |
| 4 221276 | * 12/1990 | (JP) . | |
| 5 286457 | * 4/1992 | (JP) . | |
| 6 227 428 | * 2/1993 | (JP) . | |

OTHER PUBLICATIONS

German Office Action dated Jan. 26, 2001.

* cited by examiner

*Primary Examiner*—Joseph D. Pape
*Assistant Examiner*—Kiran B. Patel
(74) *Attorney, Agent, or Firm*—Sughrue, Mion, Zinn, Macpeak & Seas, PLLC

(57) ABSTRACT

A side sill is formed into a stair-like configuration with step portions having in turn upper surfaces of lower and upper steps and an intermediate rise portion rising from the step portion so as to reach the step portion of the upper step. A lower end of a center pillar having substantially an angular 8-shaped cross-section is cut in conformity with the stair-like configuration of the side sill. The cutting of the center pillar exposes the intermediate wall, and the exposed intermediate wall is then brought into abutment with the rise portion, whereupon abutment portions so produced are welded together to thereby get the side sill and the center pillar integrated with each other.

11 Claims, 4 Drawing Sheets

PILLAR JOINT STRUCTURE FOR AUTOMOTIVE VEHICLE

BACKGROUND OF THE INVENTION

1. Field of the Invention

The present invention relates to a pillar joint structure for an automotive vehicle.

2. Description of the Related Art

Conventionally, the use of aluminum for structural members of a vehicle body has been considered as one means for reducing the weight of a vehicle. A frame structure shown in FIG. 4 is one type of frame structure adopted for passenger vehicles. A front pillar 112 and a center pillar 113 as a pillar of an automotive vehicle are joined to a side sill 111, respectively, at lower end portions thereof In joining the pillars to the side sill as described above, for instance, the lower end of the front pillar (center pillar) is butt welded to the side sill so that the both members are integrated with each other as part of a frame structure. However, there remains a risk that a strength sufficient to protect against a side collision cannot be obtained by butt welding the center pillar to the side sill only where the former abuts with the latter.

SUMMARY OF THE INVENTION

To solve the above problem, it is an object of the present invention to secure a sufficient strength without increasing the number of components in the joint of an automotive pillar with the side sill or the like.

To attain this object, according to the present invention, there is provided a pillar joint structure for an automotive vehicle, including: a side member having a stair-like joint portion, the stair-like joint portion including an upper surface, a lower surface and a rise surface contiguously provided orthogonal to the upper and lower surfaces; and a pillar member joined substantially orthogonal to the side member at the stair-like joint portion. The pillar member and the side member are welded to each other in a state that an axial end face of the pillar member is brought into abutment with the lower surface of the side member and an axial end portion of the pillar member is brought into abutment with the rise surface of the side member.

According to the above structure, since the pillar member and the side member, which are provided so as to meet each other substantially at right angles, are joined together not only at the axial end face of the pillar member but also at the rise portion of the side member, the axial end portion of the pillar member can be supported by the rise portion of the side member even when an external force is applied to the axial end portion of the pillar member as a result of a side collision, thereby making it possible to obtain a sufficient strength against a side collision.

In addition, in the present invention, the pillar member includes a center pillar extrusion molded so as to have a quadrangular hollow cross-section partitioned with an intermediate wall in a transverse direction of a vehicle body, and the side member includes a side sill of a floor portion of the vehicle body. The intermediate wall of the quadrangular hollow cross-section partitioned therewith extends along the full length of the center pillar for use as a partition, and a transversely outward quadrangular hollow cross-sectioned portion of the center pillar is cut at an upper portion thereof so as to leave a transversely inward quadrangular hollow cross-sectioned portion thereof, while a transversely inward quadrangular hollow portion of the center pillar is cut at a lower portion thereof so as to leave a transversely outward quadrangular hollow cross-sectioned portion thereof, so that an axial end face of the lower portion of the center pillar is brought into abutment with a step portion of the side sill (1), while a lower end portion of the lower portion of the intermediate wall is brought into abutment with a rise portion of the side sill, whereby the center pillar and the side sill are welded to be joined to each other.

According to the above structure, a center pillar configuration can be formed using the extrusion molded member having the quadrangular hollow cross-section partitioned with the intermediate wall in which upper and lower portions of the center pillar are displaced, respectively, inwardly and outwardly relative to each other in the transverse direction of the vehicle body, and the lower portion of the center pillar left so as to remain as a quadrangular hollow cross-sectioned portion is brought into abutment with the rise portion of the side sill, whereby a sufficient strength can be secured against a side collision.

DETAILED DESCRIPTION OF THE PREFERRED EMBODIMENTS

With reference to the accompanying drawings, a mode of operation of the present invention will be described in detail below.

Figure 1:
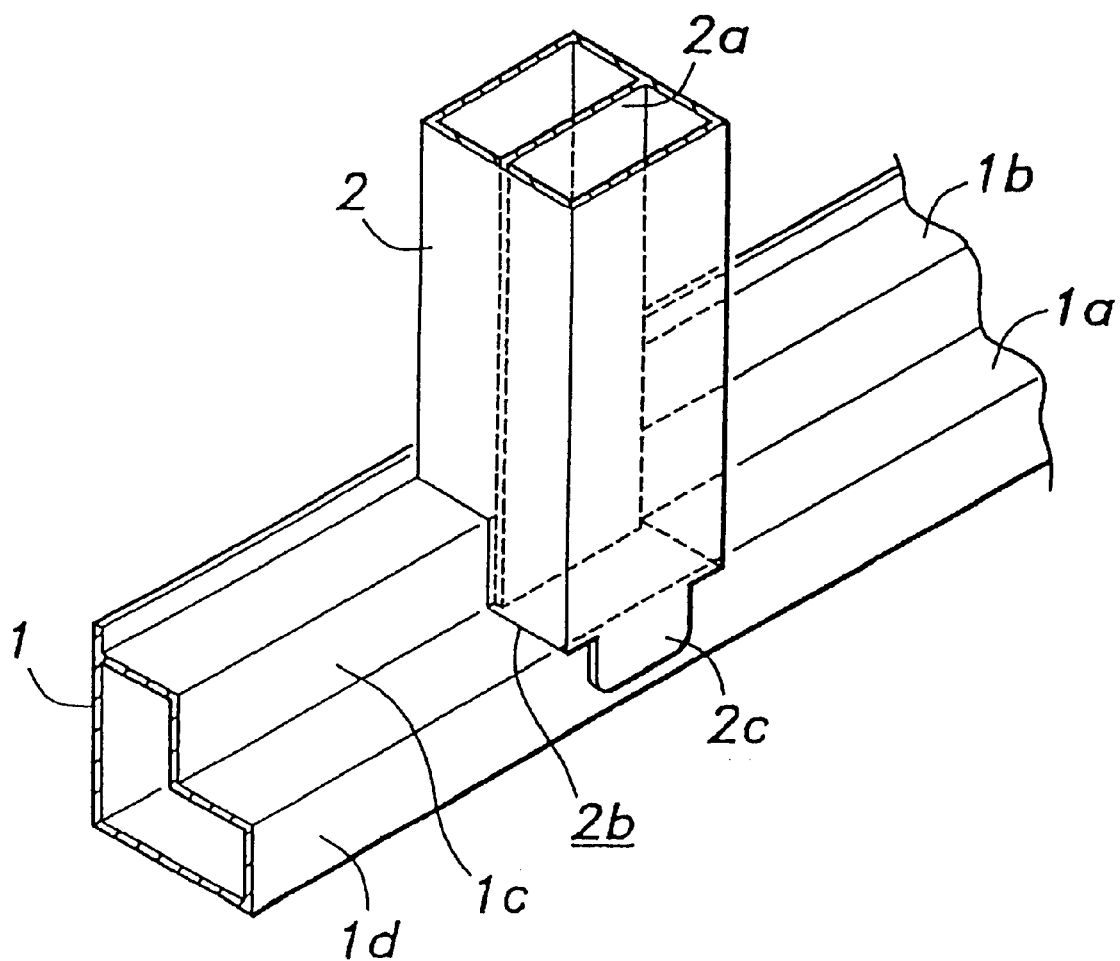
FIG. 1 is a diagrammatic perspective view of a main part of a center pillar of an automotive vehicle to which the present invention is applied, showing a state in which the center pillar is joined to a side sill.
Figure 4:
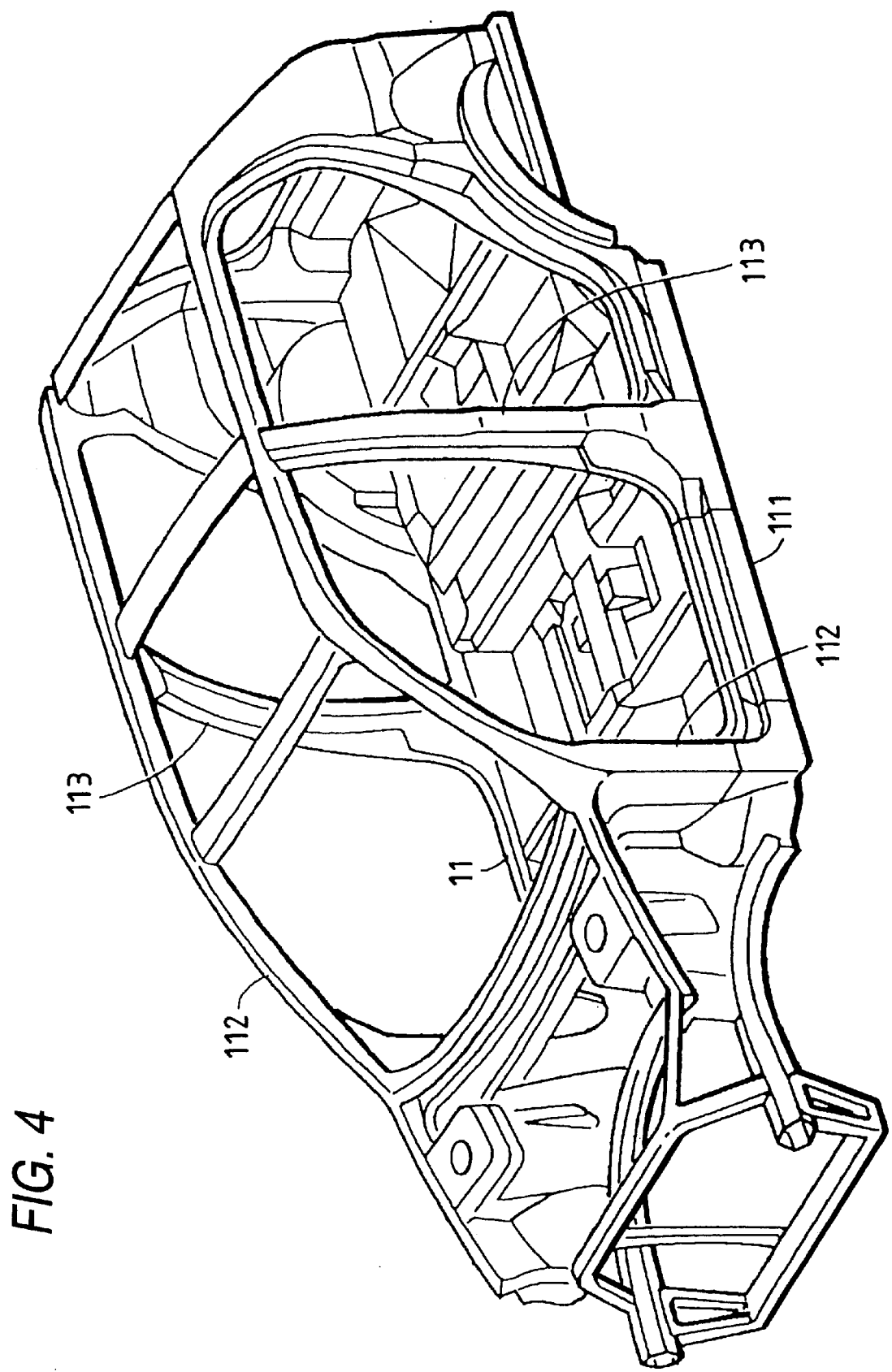
FIG. 4 is a schematic perspective view showing a frame structure for an automotive vehicle.

FIG. 1 is a diagrammatic perspective view showing a state in which a center pillar as a pillar member of an automotive vehicle is joined to a side sill, applied to which center pillar is the present invention. As shown in FIG. 1, a side sill 1 of this vehicle body is extrusion molded into a stair configuration oriented transversely outwardly and having an L-shaped cross-section, and the side sill 1 extends along a side edge of a floor portion of the vehicle body. Joined to an intermediate portion of the side sill 1 in such a manner as to erect thereat is the center pillar 2 extrusion molded into substantially an angular 8-shape cross-section. The center pillar 2 is welded to be joined to a side rail of a roof portion of the vehicle body at an upper end portion thereof as shown in FIG. 4 showing a general frame structure for a passenger vehicle.

The side sill 1, to which the lower end of the centerpillar 2 is joined, is formed into a stair-like configuration, as described above, and has step portions 1a, 1b comprising, respectively, upper surfaces of lower and upper steps and an intermediate rise portion 1c comprising a wall rising from the step portion 1a so as to reach the step portion 1b of the upper step.

Figure 2:
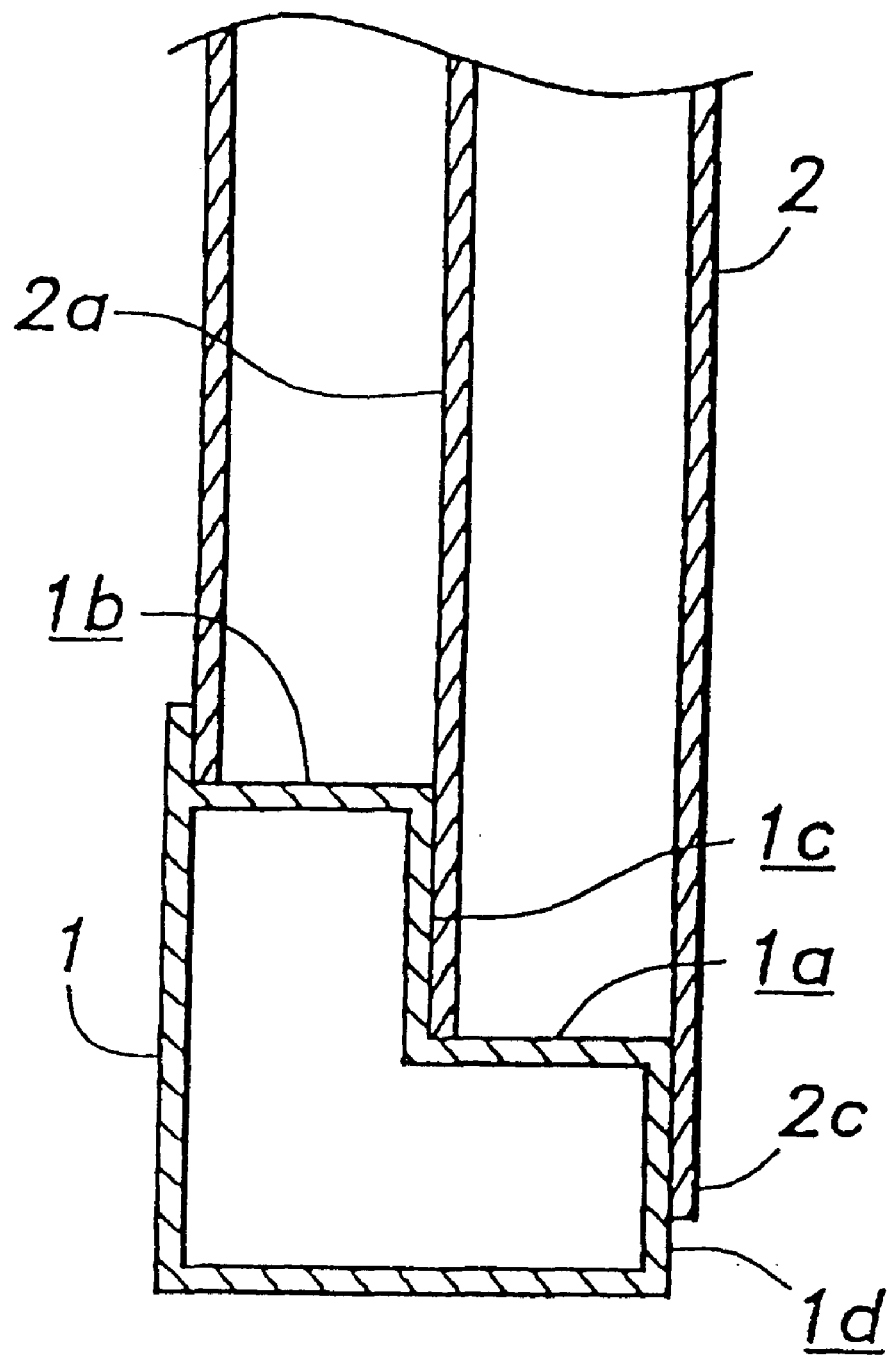
FIG. 2 is a vertically cross-sectional view of the portion of FIG. 1 where the center pillar is joined to the side sill.

In this embodiment, a lower end portion of the center pillar 2 is cut in conformity with the stair-like configuration of the side sill 1. As better shown in FIG. 2, the intermediate wall 2a constituting substantially the angular 8-shaped cross-section is partially exposed by the cutting, and an exposed portion of the intermediate wall 2a is designed to abut with the rise portion 1c. Then, edges 2b of the lower end portions of the center pillar 2 which are in abutment with the step portion 1a and edges of the intermediate wall 2a which are in abutment with the rise portion 1c are welded, whereby the center pillar 2 is joined to the side sill 1.

According to the above structure, in a case where an external force is applied from the side of the vehicle body to the center pillar 2 at the time of a side collision, the intermediate wall 2a of the center pillar 2 is retained by the intermediate rise portion 1c of the side sill 1. Therefore, a sufficient strength against an impact from the side collision can be secured without providing a T-shaped joint member such as the prior art pillar joint structure. Accordingly, the number of components and man hours required for assembly can be reduced in an improved fashion. In addition, attributed to the increase in strength are the stair-like configuration of the side sill 1, the configuration of the center pillar 2 which complements the stair-like configuration, and the increase in welding distance along which the side sill 1 and the center pillar 2 are welded together at their contact portions. Thus, this also helps the reduction of the number of components and man hours required for assembly.

In addition, a part of an outer wall of the center pillar 2 which faces transversely outwardly is caused to extend into a tongue-like configuration in such a manner as to abut with a rise portion 1d which rises from a lower surface of the side sill 1 and reaches the step portion 1a of the lower step. When welding the center pillar 2 to the side sill 1, temporary locking of the two members is facilitated by bringing the tongue-like portion 2c into abutment with the rise portion 1d, and such abutment also serves to improve the positioning accuracy and welding stability.

In the embodiment illustrated in the drawings, the joining of the center pillar 2 is described, but the present invention is not limited to the center pillar 2 and may be applied to the front pillar. That is, effectiveness similar to that described above can be provided if a joining portion of the front pillar to the side sill is configured similarly.

Moreover, with respect to the pillar having substantially an angular 8-shaped cross-section, since the intermediate wall 2a constitutes a neutral point and there exists no contribution of elongation strength, the pillar becomes strong against bending. Moreover, since the aforesaid joint structure between the center pillar so cross-sectioned and the side sill 1 having the stair-like configuration can reduce a torsional moment applied to the side sill 1 at the time of a side collision, the strength against a side impact from a side collision can be increased.

Figure 3:
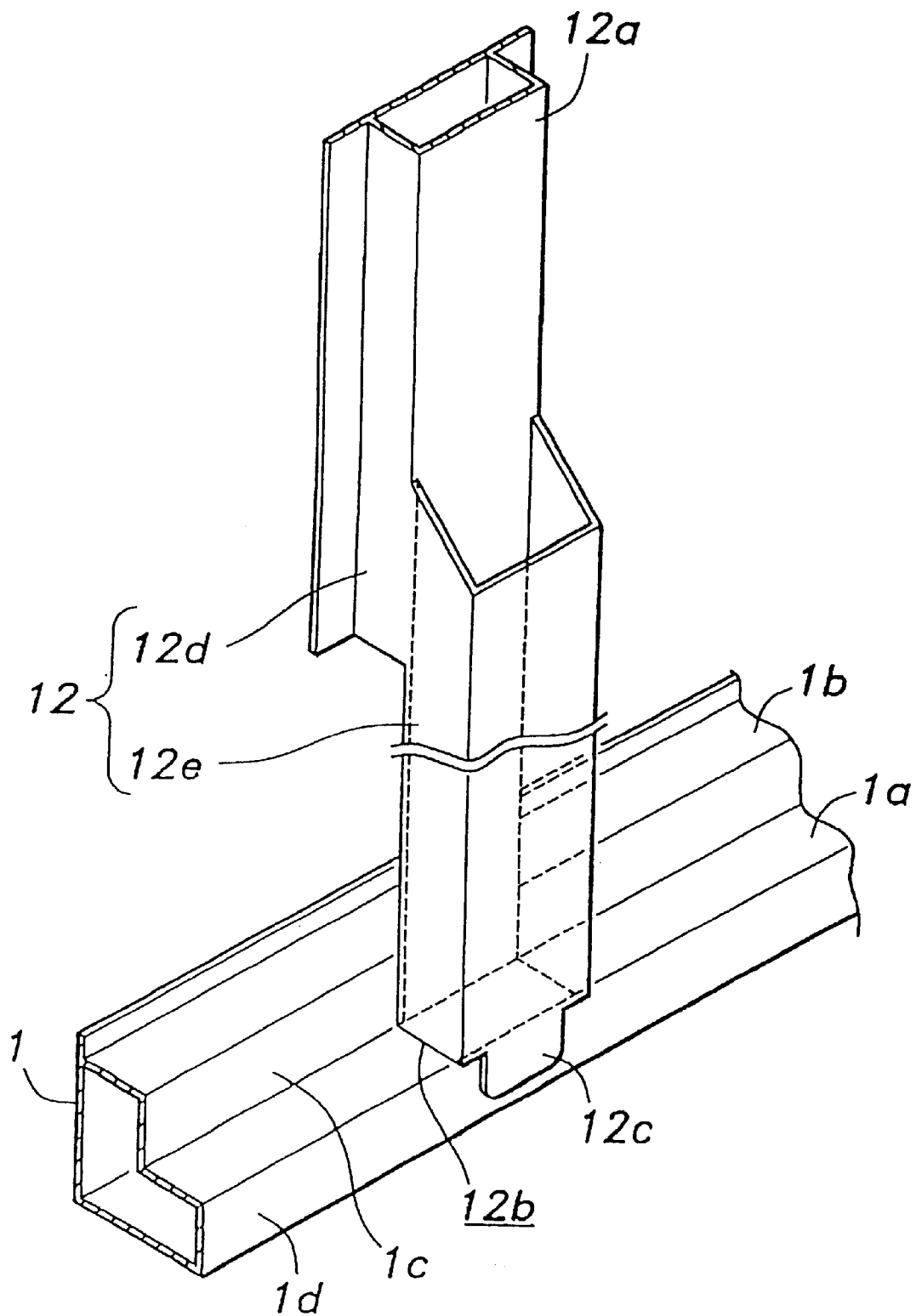
FIG. 3 is a diagrammatic perspective view of a main part of another embodiment according to the present invention.

Next, referring to FIG. 3, another embodiment according to the present invention will be described below. Portions similar to those described with respect to the above embodiment will be designated by the same reference numerals and the description thereof will be omitted. A center pillar 12 shown in FIG. 3 is also extrusion molded into a configuration having substantially an angular 8-shaped cross-section, but the center pillar 12 of this embodiment is constructed such that an upper side portion of the center pillar 12 which is joined to a side rail of a roof portion has an inside portion 12d with a box-shaped cross-section, transversely inward formed in the vehicle, and a lower side portion of the center pillar 12 which is joined to a side sill 1 has an outside portion 12e with a box-shaped cross-section, transversely outward formed in the vehicle. Substantially the angular 8-shaped cross-section is partially left to reside at an intermediate portion between the upper and lower side portions.

A lower end portion of the outside portion 12e is disposed on the step portion 1a of the lower step of the side sill 1 having a stair-like cross-section in such a manner as to erect therefrom as described in the previous embodiment, and an intermediate wall 12a is brought into abutment with the rise portion 1c of the side sill 1. Then, edges 12b of the outside portion 12e which are in abutment with the step portion 1a and edges of the intermediate wall 12a which are in abutment with the rise portion 1c are welded thereto, whereby the center pillar 12 is joined to the side sill 1. In addition, a tongue-like portion 12c is formed similarly to the previous embodiment, and the effectiveness thereof is similar to that provided in that embodiment.

The upper side portion of the center pillar 12 is positioned transversely inwardly relative to the lower side portion thereof so that the upper side portion is positioned transversely inwardly of the glass surfaces of the doors, while the lower side portion of the center pillar 12 is positioned transversely outwardly relative to the upper side portion thereof so that a seat belt retractor is allowed to be mounted at a lower portion of the lower side portion.

Also, with this center pillar 12, if an external force is applied thereto from the side of the vehicle body at the time of a side collision, since the intermediate wall 12a of the center pillar 12 is locked by the intermediate rise portion 1c of the side sill 1, a strength can be increased sufficiently against the side collision, and an effectiveness which is similar to that provided in the previous embodiment can be thus obtained. In addition, two extrusion members each having a substantial box-shaped cross-section can partially be welded together to form a single center pillar, but in that case, since the thickness of an intermediate welded portion is increased (because the thickness thereat is doubled by the overlapped portions of the two members), stress is normally concentrated at a plate thickness transition point. However, with the embodiment of the present invention, since the intermediate wall 12a is commonly used for the upper and lower side portions, there is no change in cross-section of the intermediate wall 12a, there being generated no concentration of stress.

The embodiment is also described with respect to the center pillar, but the present invention is not limited thereto and may be applied to the front pillar.

Thus, according to the present invention, since the axial end portion of the pillar member, which is joined to the side member in such a manner as to meet it substantially at right angles, is brought into abutment with the rise portion of the side member and is joined thereto, the axial end portion of the pillar member which receives an external force from the side is supported by the rise portion of the side member, whereby a sufficient strength against a side impact from a side collision can be obtained. In addition, the pillar joint structures according to the present invention can be applied to a center pillar configuration in which upper and lower halves are displaced, respectively, transversely inwardly and outwardly relative to each other, and thus, in particular, a sufficient strength can be provided to cope with a side impact from a side collision.

While certain embodiments of the invention have been specifically described herein, it will apparent that numerous modifications may be made thereto without departing from the spirit and scope of the invention.

The present disclosure relates to the subject matter contained in Japanese patent application No. Hei. 10-293968 filed on Oct. 15, 1998 which is expressly incorporated herein by reference in its entirety.

What is claimed is:

1. A pillar joint structure for an automotive vehicle, comprising:
   a side member having a stair-like joint portion, said stair-like joint portion including an upper surface, a lower surface and a first rise surface contiguously provided orthogonal to said upper and lower surfaces; and
   a pillar member having longitudinally extending outer walls and a first axial end face, said first axial end face having edges that intersect with portions of said outer walls, said pillar member being joined substantially orthogonal to said side member at said stair-like joint portion,
   wherein said pillar member and said side member are welded to each other in a state that said edges of said first axial end face of said pillar member are brought into abutment with the lower surface of said side member and an axial end portion of said pillar member is brought into abutment with the first rise surface of said side member.

2. A pillar joint structure for an automotive vehicle according to claim 1, wherein said pillar member is a center pillar extrusion molded so as to at least partially have substantially an angular 8-shaped cross-section, and said side member is a side sill constructing a floor portion of said automotive vehicle.

3. A pillar joint structure for an automotive vehicle, according to claim 2, wherein said center pillar having substantially the angular 8-shaped cross-section includes a joint portion with the first axial end face brought into abutment with the lower surface of said side sill, a second axial end face brought into abutment with the upper surface of said side sill, and the axial end portion brought into abutment with the first rise surface of said side sill, so that said joint portion of said center pillar matches with said stair-like joint portion of said side sill.

4. A pillar joint structure for an automotive vehicle according to claim 3, wherein the axial end portion of said center pillar is an end of an intermediate wall constructing substantially the angular 8-shaped cross-section.

5. A pillar joint structure for an automotive vehicle according to claim 2, wherein said center pillar includes:
   an upper portion having a box-shaped cross-section;
   a lower portion disposed outside relative to said upper portion in a transverse direction of the automotive vehicle, said lower portion having a box-shape cross-section; and
   a connecting portion connecting a lower end of said upper portion with an upper end of said lower portion, said connecting portion having substantially the angular 8-shaped cross-section,
   wherein an intermediate wall of substantially the angular 8-shaped cross-section at said connecting portion extends over the whole length of said center pillar so as to construct one side of said lower portion and one side of said upper portion,
   said center pillar and said side sill are welded to each other in a state that the axial end face of said lower portion is brought into abutment with the lower surface of said side sill and the axial end of said one side of said lower portion is brought into abutment with the rise surface of said side sill.

6. The pillar joint structure for an automotive vehicle according to claim 1, further including a tongue portion which extends from said pillar member.

7. The pillar joint structure for an automotive vehicle according to claim 6, wherein said tongue member abuts a second rise surface of said side member.

8. The pillar joint structure for an automotive vehicle according to claim 3, wherein the second axial end face has edges which intersect with portions of said outer walls of said pillar member and are brought into abutment with the upper surface of said side member.

9. The pillar joint structure for an automobile vehicle according to claim 3, wherein said center pillar having substantially the angular 8-shaped cross-section forms two tubular sections.

10. The pillar joint structure for an automobile vehicle according to claim 1, wherein said pillar member comprises a one-piece, unitary body.

11. A pillar joint structure for an automotive vehicle, comprising:
   a side member having a stair-like joint portion, said stair-like joint portion including an upper surface, a lower surface and a first rise surface contiguously provided orthogonal to said upper surface and said lower surface; and
   a pillar member joined substantially orthogonal to said side member at said stair-like joint portion, said pillar member comprising a one-piece, unitary body including inside and outside box-shaped portions located in a traverse direction of the automotive vehicle so as to at least partially have a substantially angular 8-shaped cross-section, each one side of said inside and outside box-shaped portions being defined by a common intermediate wall of said pillar member, said outside box-shaped portion protruding at a lower end thereof with respect to said inside box-shaped portion so that said intermediate portion of said outside box-shaped portion defines an axial end portion and lower edges of said outside box-shaped portion defines a first axial end face,
   wherein said pillar member and said side member are welded to each other in a state that said first axial end face of said pillar member is brought into abutment with the lower surface of said side member and said axial end portion of said pillar member is brought into abutment with the first rise surface of said side member.

* * * * *